C. T. SMITH.
Baking-Pans.
No. 144,417.  Patented Nov. 11, 1873.
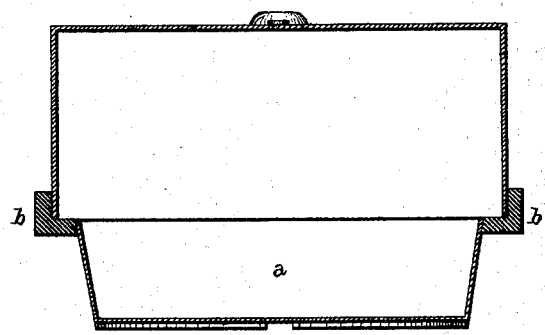
WITNESSES.
Alex Davidson
W. H. Duhamel
INVENTOR.
Chas. T. Smith
Per H. S. Abbot
atty.

UNITED STATES PATENT OFFICE.

CHARLES T. SMITH, OF JERSEY CITY, NEW JERSEY.

IMPROVEMENT IN BAKING-PANS.

Specification forming part of Letters Patent No. 144,417, dated November 11, 1873; application filed January 23, 1873.

*To all whom it may concern:*

Be it known that I, CHARLES T. SMITH, of Jersey City, county of Hudson and State of New Jersey, have invented certain new and useful Improvements in Baking-Pans, of which the following is a specification:

The nature of my invention relates to the construction of a baking-pan; and consists in securing a cast-iron rim, having a square shoulder formed upon its inside, to the top of the pan, in which the cover fits so as to make an air-tight joint.

The accompanying drawing represents a vertical cross-section of my invention.

*a* represents the baking-pan, which is made of sheet metal, having the cast-iron rim *b* secured to its top, which has a square shoulder formed around its inside, so as to receive the cover. On the bottom of the pan are suitable legs or projections, so as to raise the bottom of the pan up from the hearth or oven, so as to give a free circulation of hot air entirely around the pan. The cover, of the shape shown, has square edges, and fits down inside of the square shoulders, and is provided with a suitable valve, through which the steam and vapor may be allowed to escape just before raising the cover.

The pan and the cover may be secured together by any suitable fastening that may be desired.

As the steam and vapor condense in the pan and settle down around the edges of the cover, an almost air-tight joint is formed, which effectually prevents the escape of the flavors of the meat, that usually pass off while cooking.

Having thus described my invention, what I claim as new, and desire to secure by Letters Patent, is—

As a new article of manufacture, the pan *a*, having secured to its top the cast-iron rim *b*, having a square shoulder formed around its inside, so as to receive the cover, substantially as specified.

In testimony that I claim the foregoing as my invention I hereunto affix my signature this 22d day of January, 1873.

CHARLES T. SMITH.

Witnesses:
 DANIEL L. REEVE,
 W. R. GARDNER.